J. O. MOORE.
Milk Cooler.
No. 56,780.
Patented July 31, 1866.
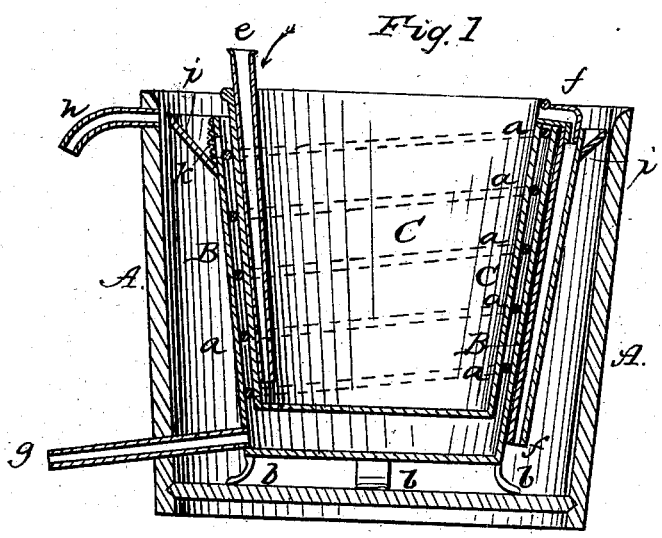
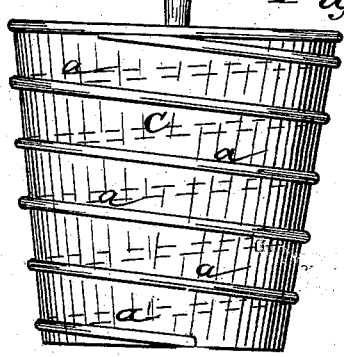

UNITED STATES PATENT OFFICE.

J. OWEN MOORE, OF WASHINGTONVILLE, NEW YORK.

IMPROVED APPARATUS FOR COOLING MILK.

Specification forming part of Letters Patent No. 56,780, dated July 31, 1866.

*To all whom it may concern:*

Be it known that I, J. OWEN MOORE, of Washingtonville, in the county of Orange and State of New York, have invented a new and Improved Apparatus for Cooling Milk and other Liquids; and I do hereby declare that the following is a full, clear, and exact description thereof, which will enable others skilled in the art to make and use the same, reference being had to the accompanying drawings, forming part of this specification, in which—

Figure 1 represents a vertical cross-section of this apparatus. Fig. 2 represents an end view of the inner vessel, C.

Similar letters of reference indicate like parts.

The object of this invention is to cool the milk as it is taken from the cow to a temperature which allows its being transported without becoming sour; and the improvements consist in so constructing the apparatus that the milk passes between two sheet-metal plates, both of which plates are cooled, on the side opposite the one along which the milk passes, by water or any other cooling-liquid; and it further consists in so arranging the apparatus that it may be easily cleaned, and that, furthermore, the water will always be kept cool, the warmed portion of it only being allowed to escape.

It has always been a great cause of annoyance and delay to farmers and all persons having dairies that the milk could not be cooled with reasonable despatch and facility after it came from the cow.

It is known that the milk in the state mentioned has a temperature of 92° Fahrenheit, and as the animal heat is highly detrimental to its keeping well while being transported to market said animal heat has to be removed, which is only done effectually when the milk is cooled down to at least 60° Fahrenheit. It was therefore the custom to put the cans which were filled with the warm milk into a spring or a vessel containing cold water, and then, by stirring the milk, to bring as many particles of it as possible to the cooled surface of the can containing it, a performance highly insufficient and combined with much loss of time.

By my improved apparatus all these disadvantages are completely overcome, and it may also be used with equal advantage for cooling any other liquid whatsoever.

Into the tub or vessel A, which is made of wood or any other suitable material, is placed another vessel, B, whose diameter is so much smaller than that of vessel A that a sufficient quantity of water may be in the space left between the walls of these two vessels, for which purpose also the bottom of vessel B is not allowed to touch that of vessel A, the former being supported by the legs or standards *b*. A third vessel, C, around the outer surface of which a wire, *a*, of sufficient thickness is coiled and firmly attached in the manner shown in Fig. 2, is now inserted into the vessel B in such a manner that said coiled wire *a* will, by the weight of vessel C, be pressed against the inner side of vessel B, which is attained by the sloping shape of said vessels, as seen in Fig. 1.

The coiled wire resting against the outer surface of vessel C and the inner one of vessel B forms a spiral channel through which the milk is made to pass, and the same is therefore well enabled to come in constant contact with the aforesaid surfaces of vessels B and C, both of which are made of sheet metal or any other suitable conducting material.

The bottom of vessel *c* does not touch that of vessel B, as seen in Fig. 1.

The water or other cooling-liquid is poured through a funnel and the pipe *e*, to the bottom of vessel C, said pipe *e* being secured to the vessel C in the manner shown in Fig. 1, and as the water becomes warm the warmer portions of it will rise to the surface and thence pass through the pipe *f*, which is attached to outside of vessel B, to the bottom of vessel A, whence the warmest portions of it will again rise and escape through the pipe *h*, attached to the upper part of vessel A. Thus the water will be constantly circulating around the spiral channel above mentioned, and will therefore greatly tend to cool the milk which passes through said spiral channel, more so as the warmest portions of the water are ejected, and the colder ones only are retained.

The milk is poured into the annular trough *i*, whence it passes through the strainer *k* into the spiral channel formed by the coiled wire $a$, touching the respective inner and outer walls of vessels B and C, and while passing through the same is completely cooled by the action of the water on said walls, and when reaching the bottom of vessel C the milk flows off through the pipe $g$, which extends through the wall of vessel A.

This apparatus can be easily cleaned by taking out the vessel C, and as the milk is cooled effectively and in a comparatively short space of time in it, it fulfills all that can reasonably be desired of an apparatus for this purpose. The coiled wire may be attached to the inner side of vessel B instead of the outer one of vessel C, and still answer the same purpose.

The milk may be poured into the annular trough $i$ at any place, and will not enter the spiral channel until it reaches the strainer $k$.

Having thus described my invention, I claim as new and desire to secure by Letters Patent—

1. Forming a spiral channel, for the purpose set forth, by inserting a coiled wire, $a$, between the walls of the vessels B and C, substantially as shown and described.

2. An apparatus for cooling milk or other liquids, formed by combining with each other the vessels A, B, and C, pipes $e$, $f$, and $h$, trough $i$, strainer $k$, coiled wire $a$, and pipe $g$, substantially in the manner and for the purpurpose herein shown and described.

3. Constructing a cooling apparatus in such a manner that the cooling-liquid may overflow from the inner vessel, C, to the outer vessel, A, without coming in contact with the milk contained in the intermediate vessel, B, substantially as and for the purpose shown and described.

4. The combination of the annular trough $i$ with the strainer $k$ and vessels B and C, substantially as described.

The above specification of my invention signed by me this 23d day of May, 1866.

J. OWEN MOORE.

Witnesses:
 WM. F. MCNAMARA,
 ALEX. F. ROBERTS.